H. BRETSCHER.
DEMOUNTABLE RIM.
APPLICATION FILED DEC. 12, 1917.

1,290,889.

Patented Jan. 14, 1919.
2 SHEETS—SHEET 1.

Witnesses:
Fred Koeger
Louise Keller

Hans Bretscha, Inventor
By Henry Schreiter his Attorney

H. BRETSCHER.
DEMOUNTABLE RIM.
APPLICATION FILED DEC. 12, 1917.

1,290,889.

Patented Jan. 14, 1919.
2 SHEETS—SHEET 2.

Witnesses:

Hans Bretscher, Inventor

By Henry Schreiter his Attorney

UNITED STATES PATENT OFFICE.

HANS BRETSCHER, OF NEW YORK, N. Y., ASSIGNOR OF ONE-HALF TO FELIX SPITZNER.

DEMOUNTABLE RIM.

1,290,889.  Specification of Letters Patent.  Patented Jan. 14, 1919.

Application filed December 12, 1917. Serial No. 206,779.

*To all whom it may concern:*

Be it known that I, HANS BRETSCHER, a citizen of Switzerland, and a resident of the borough of Manhattan, city, county, and State of New York, have invented certain new and useful Improvements in Demountable Rims, of which the following is a complete specification.

This invention relates to demountable rims for vehicle wheels, used for affixing pneumatic tires thereto, and consists in the hereinafter described construction of a demountable rim, examples whereof are illustrated in the accompanying drawings, wherein—

Fig. 5 is a bottom view of the joint of the two parts of the segment of the rim shown in Fig. 3 with the connecting plate in position;

Fig. 6 is a sectional view thereof on line 6—6 indicated in Fig. 5,

Fig. 7 is a plan view of the ends of the segment and of the locking sections of the rim in their position shown in Figs. 1 and 3;

Fig. 8 is a sectional view thereof on line 8—8 indicated in Fig. 7, and

Fig. 9 is a plan view of the ends of the segment and of the locking sections in their closed position, as they are shown in Figs. 2 and 4.

Figure 1:
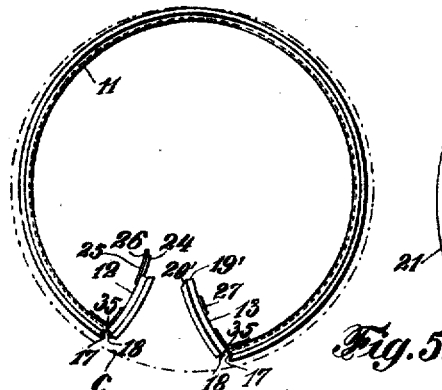
Figure 1 is a side elevation of my improved demountable rim, showing the locking sections in open position.

The inventive idea of a partly or wholly collapsible demountable rim, for vehicle wheels, has been exploited by other inventors, and a number of forms of demountable rims have been patented, or used experimentally, or both. However, the difficulty, which the heretofore known constructions of collapsible demountable rims have not successfully solved, is the capability of the interlocking means to resist the tendency of the sections of the rim to spring apart, particularly when the rim, with the pneumatic tire secured thereon, is carried in the holder on the vehicle as reserve for replacing one of those affixed on the wheels, the rim being then subjected to the jolts and vibration incidental to the run of the vehicle over rough roads, or when the rim is accidentally dropped, for instance in taking it from the holder to mount it on the wheel. This defect, I believe has prevented the collapsible demountable rims heretofore devised, from coming into practical use.

The object of my invention is to so construct the means for locking the sections of the rim together that the rim will resist the tendency of the pneumatic tire mounted thereon to collapse it, and also the jolts and vibration to which it is exposed when being carried in the holder on the vehicle, and when the rim, with the tire affixed thereto, is being mounted on the felly of the wheel.

A further object of my invention is to effect this without making use of cumbersome duplicate parts, or of auxiliary devices, by which its serviceability is detrimentally affected.

With these objects in view, I have designed the sectional collapsible rim and the particular interlocking features of the several sections of the rim, and the shapes of the free ends of the hinged sections, as shown in the drawings, and as hereinafter described.

Referring now particularly to Fig. 1, the reference numeral 11 designates the segment, which may be termed the "main section" of the rim. This segment does not conform to a true circle as will be seen by comparing its outline with the dotted line marked *c*, which indicates the periphery of a true circle concentrical therewith. The object of this deviation is to utilize the resistancy of this segment to being so expanded for assisting in maintaining the sections 12 and 13, securely interlocked. The sections 12 and 13 are hinged, one to each of the ends of the segment 11, and they are interlocked when the pneumatic tire 21 is mounted thereon.

Figure 8:
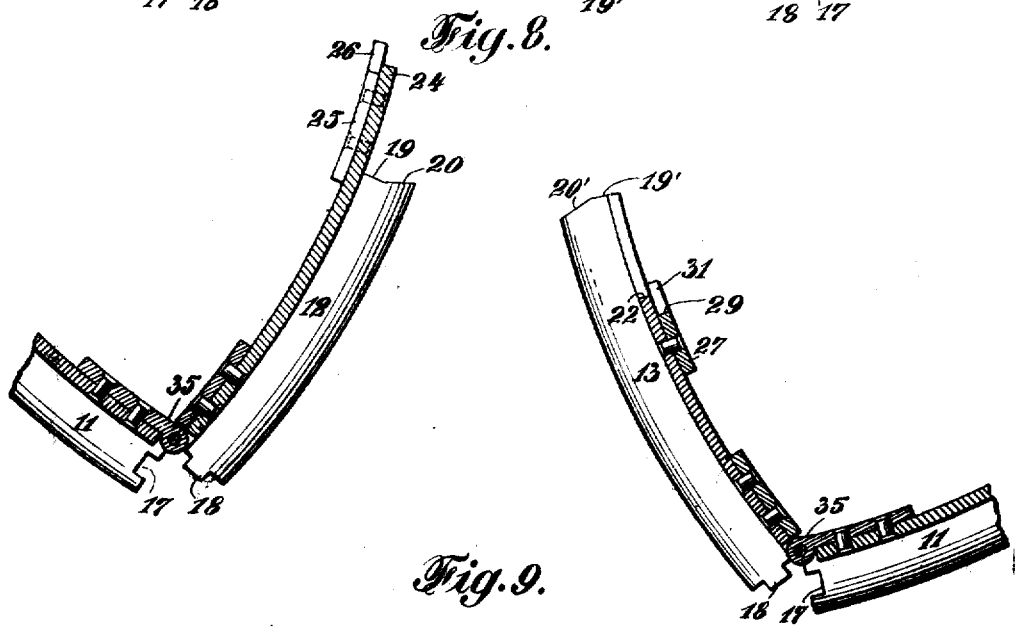
Figure 9:
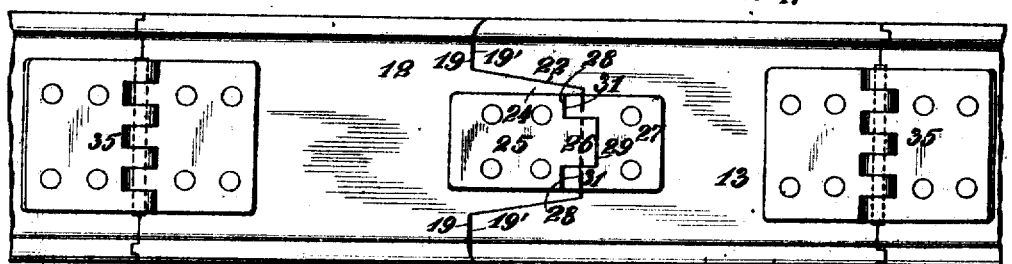

The hinging of these sections, which permits of their being swung (opened) inwardly, and the construction of their termini, are shown in Fig. 8. The ends of the segment 11 are recessed at 17 and the corresponding ends of the sections 12 and 13 are formed with projecting tongues, or tenons 18, fitting into the recesses 17. The free ends of sections 12 and 13 are also made interlocking; the end of section 12 is angularly recessed and the end of section 13 cut to correspondingly project as shown at 19 and 20 and 19' and 20' in Fig. 8. Their lengths are calculated to supplement the segment 11 to obtain a rim forming a complete circle of the size desired when the sections 12 and 13 are swung into the position shown in Figs. 2 and 4. When the sections 12 and 13 are set into the circumferential line of the rim, the tenons 18 enter into the recesses 17 and the projecting end of the section 13 enters into the recessed end of section 12. By this the ends of the segment 11, to which the sections 12 and 13 are hinged, are moved apart, and the tendency of the segment 11 to resume its original form presses the sections 12 and 13 together, and conjointly with the conformation of their ends, produces a substantially rigid joint between these parts. The segment 11, which, as hereinbefore explained, does not conform to a true circle, and its resistance to being so conformed to the circumferential line of a true circle, is alone sufficient to hold the sections 12 and 13 in their interlocked position, unless a force, sufficient to overcome this tendency of segment 11, is employed. This action of the segment 11 is reinforced by the angular shaping of the joint of the ends of these sections which deviates from the radial line of the rim, and requires the ends of the segment 11 to be spread farther apart momentarily when the sections 12 and 13 are thus being interlocked. This wider spreading apart of the ends of the segment 11 again required for their unlocking, and thus also the angular shaping of the free ends of the hinged sections 12 and 13, assists in preventing their accidental disengagement. When the tire casing is mounted on the rim, the force required to unlock the ends of sections 12 and 13 must be additionally sufficient to spread it also correspondingly.

Extended practical experience with demountable rims, constructed according to this, my invention, has demonstrated that the ends of the hinged sections 12 and 13 are not disengaged when the rim, with the tire mounted thereon, is exposed to the vibrations, incidental to being carried on the vehicle traveling over rough roads, nor by the harder jolts it receives in the necessary handling of it when being applied to the felly of the wheel, or by dropping it.

Figure 7:
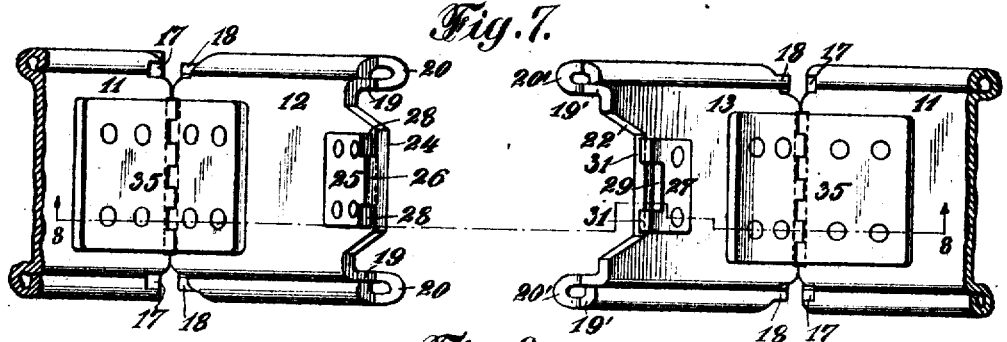

To obtain lateral rigidity of the joint between the free ends of the hinged sections 12 and 13 the flat part of the end of one of the sections, the section 13 in this instance, is recessed as shown in Fig. 7 at 22, and on the end of the other section, the section 12 in this instance, a tongue 24 is formed, snugly fitting into the recess 22. In addition thereto a plate 25, having a tongue 26 formed thereon, is riveted to the tongue 24, so that it extends beyond the tongue 24, whereas the recessed portions 28 of the plate 25 are receded for a corresponding distance from the edge of the tongue 24. The plate 27, similarly riveted to the end of section 13, is recessed at 29, the recess corresponding in shape and dimensions to the tongue 26 of the plate 25. The portions 31 of the plate 27 project beyond the base of the recesses 22 to the same extent as the recessed portions 28 of the plate 25 are receded from the end of the tongue 24. By this arrangement a double interlocking of the sections 12 and 13 is effected, which effectively prevents a lateral displacement of these two sections, and relieves the hinges 35 of the strain to which they would be otherwise subjected. The plates 25 and 27 and their interlocking joint, as described, serve also to hold the sections 12 and 13 in proper alinement, and prevent excessive strain upon the joints of the rear ends of these sections with the ends of the segment 11 in the frequently occurring rough handling of the rim by careless or ignorant operators when the pneumatic tire 21 is being placed thereon.

Figure 2:
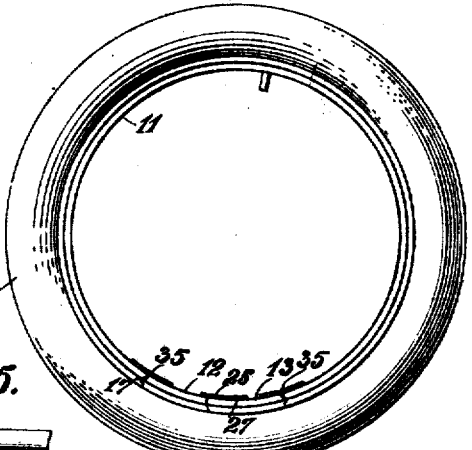
Fig. 2 is a side elevation of the rim, showing a pneumatic tire affixed thereto and the locking sections in closed position.
Figures 3, 4:
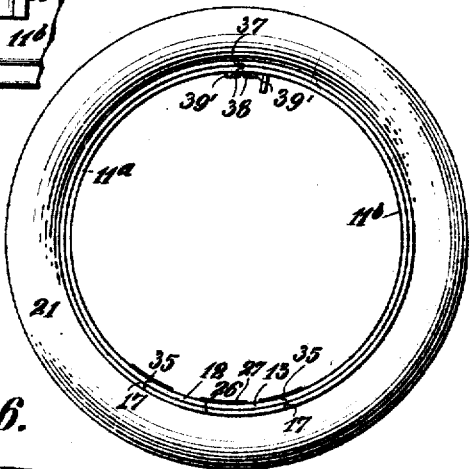
Fig. 3 is an elevation of a demountable rim, constructed according to my invention, in which the segment to which the locking sections are hinged, is made in two parts, and of the connecting plate therefor.
Fig. 4 is an elevation showing the pneumatic tire affixed to this form of my improved demountable rim.

To apply a pneumatic tire 21 to my improved demountable rim, as shown in Figs. 2 and 4, the rim, with the hinged sections 12 and 13 in about the position shown in Fig. 1, is placed within the tire 21, the nipple of the inner tube being passed through the hole in the rim, and the edges of the casing are pressed in, within the flanges of the segment 11. Then the remaining part of the flanges of the casing, opposite the hinged sections 12 and 13, are pressed together and the sections 12 and 13 swung thereon. During these operations the casing is lying on the work bench, or on the floor, and the demountable rim is inside. When these operations are completed, the casing with the rim may be set upon the floor in an approximately vertical position and the foot of the operator set upon the joint of the free ends of the sections 12 and 13, or otherwise sufficient pressure must be applied thereon, to snap the interlocking parts into their locked position. Thereby the segment 11 is spread to conform to the true circular line of the felly of the wheel and the free ends of sections 12 and 13 are interlocked. The tube in the casing may then be inflated to full pressure and the rim and tire are ready to be mounted upon the wheel, or set in the holder, if it is to be carried as a reserve.

Figure 5:
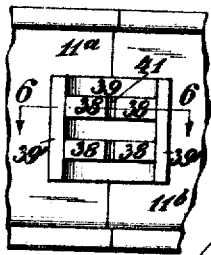
Figs. 5 to 9 are detail views, drawn on an enlarged scale.
Figure 6:
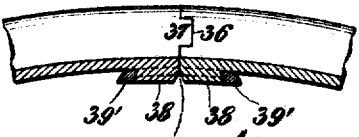

The construction of the rim as thus far described is well suited for wheels of ordinary sizes, but for wheels of larger sizes the segment 11 of the rim is preferably made in two parts, as shown in Fig. 3. The joint between the two parts 11ª and 11ᵇ of the segment 11 is made as shown in Fig. 6, and as described with reference to the joints of the ends of the segment 11 and the sections 12 and 13. Also in this instance a recess 36 is formed in the flanges of the part 11ᵇ and a corresponding tenon 37 at the end of the part 11ª. To secure these parts firmly together, and to produce the necessary rigid joint, the undercut abutments 38 are formed on each part immediately adjoining their ends. The arrangement and location of these abutments is shown in Fig. 5, where also the locking plate 39 is shown in elevation. These abutments are undercut, as shown in Fig. 6, and form what may be termed "catch-bolts", rigidly engaging with the transverse end bars 39' of the locking plate. The abutments 38 are also beveled, as shown at 41 in Fig. 6, to enable the parts 11ª and 11ᵇ to be brought together in an approximately angular position, whereby the outwardly projecting undercut edges of these abutments are brought sufficiently near together to enable the plate 39 to be set thereon, whereupon the interlocking of this plate with the abutments is effected by the moving of the other ends of the parts 11ª and 11ᵇ apart. The parts 11ª and 11ᵇ of the segment 11 are thus joined when the tire 21 is applied thereon. The described means for thus connecting and locking together the parts 11ª and 11ᵇ produce a rigid joint, the plate 39 engaging with the abutments 38 and holding the parts together longitudinally and laterally. The interlocking of the tenons 37 in the recesses 36, assists in producing a secure joint of the two parts, resisting their separation or displacement in a direction to, or away, from the center, and also laterally.

For mounting a tire casing upon the two part rim, illustrated in Figs. 3 and 4, the two parts 11ª and 11ᵇ are inserted in the casing, laid out on the work bench, with their free ends together and so that the nipple of the inner tube may be inserted through the hole provided for it in the rim; the edges of the casing are then pressed together and within the flanges of each of the parts 11ª and 11ᵇ. Then the plate 39 is set upon the abutments 38 and the ends of the parts 11ª and 11ᵇ, to which the sections 12 and 13 are hinged, moved apart to conform to the inner periphery of the tire casing 21. The further procedure is the same as hereinbefore set forth with reference to the form of the rim, illustrated in Figs. 1 and 2 of the drawings.

I claim as my invention:

1. A demountable rim for a vehicle wheel, comprising sections, hinged to swing inwardly, and each having a tenon on the hinged end, snugly fitting into a correspondingly shaped recess in the end of the adjoining section; the hinged sections having their free ends cut at an obtuse angle and fitted to interlock when swung into their position in the peripheral line of the rim; substantially as herein shown and described.

2. A demountable rim for a vehicle wheel, comprising sections, hinged to swing inwardly, and each having a tenon on the hinged end, snugly fitting into a correspondingly shaped recess in the end of the adjoining section; the hinged sections having their free ends cut at an obtuse angle in the plane of the rim, and one of the hinged sections having a tongue and the other a correspondingly shaped and dimensioned recess, formed on its free end; the free ends of these sections being thus fitted to interlock when swung into their position in the peripheral line of the rim; substantially as herein shown and described.

3. A demountable rim for a vehicle wheel comprising sections, hinged to swing inwardly, and having a tenon on one end snugly fitting into a correspondingly shaped recess in the end of the adjoining section; the hinged sections having their free ends cut at an obtuse angle in the plane of the rim; one of the hinged sections having a tongue formed on its free end and the other a correspondingly shaped and dimensioned recess, adapted to receive the tongue formed on the free end of the other hinged section; a plate, having a tongue formed thereon, affixed upon the tongue of one of the hinged sections, a second plate, having a recess formed therein fitted to receive the tongue formed on the first plate, affixed at the edge of the recessed portion of the free end of the other hinged section, the said plates, and the free ends of the hinged sections being thus fitted to interlock when swung into their position in the peripheral line of the rim; substantially as herein shown and described.

4. The combination with a demountable rim for vehicle wheels, composed of separable sections, of undercut abutments, affixed on the adjoining edges of the sections, and of a plate fitted to the rim and adapted to embrace the abutments and to engage with the undercut portions thereof when the ends of the sections are joined, thereby holding the ends of the sections together; substantially as herein shown and described.

5. Means for securing together the adjoining ends of sections of a demountable rim, the means comprising undercut abutments, one at the end of each section, and a plate, fitted to embrace the abutments, and to engage with the undercut edges thereof, when the sections are joined together; substantially as herein shown and described.

6. Means for securing together the adjoining end of sections of a demountable rim, the means comprising a tenon on the end of one section and a correspondingly shaped recess on the end of the other section; undercut abutments, one at the end of each section, and a plate, fitted to embrace the abutments, and to engage with the undercut edges thereof, when the sections are joined together; substantially as herein shown and described.

HANS BRETSCHER.

Witnesses:
PAULA BATES,
LOUISE KELLER.